May 22, 1923. 1,456,479
D. S. ATKINSON ET AL
COMBINED INTERNAL COMBUSTION AND TURBINE ENGINE
Filed April 15, 1920 4 Sheets-Sheet 1
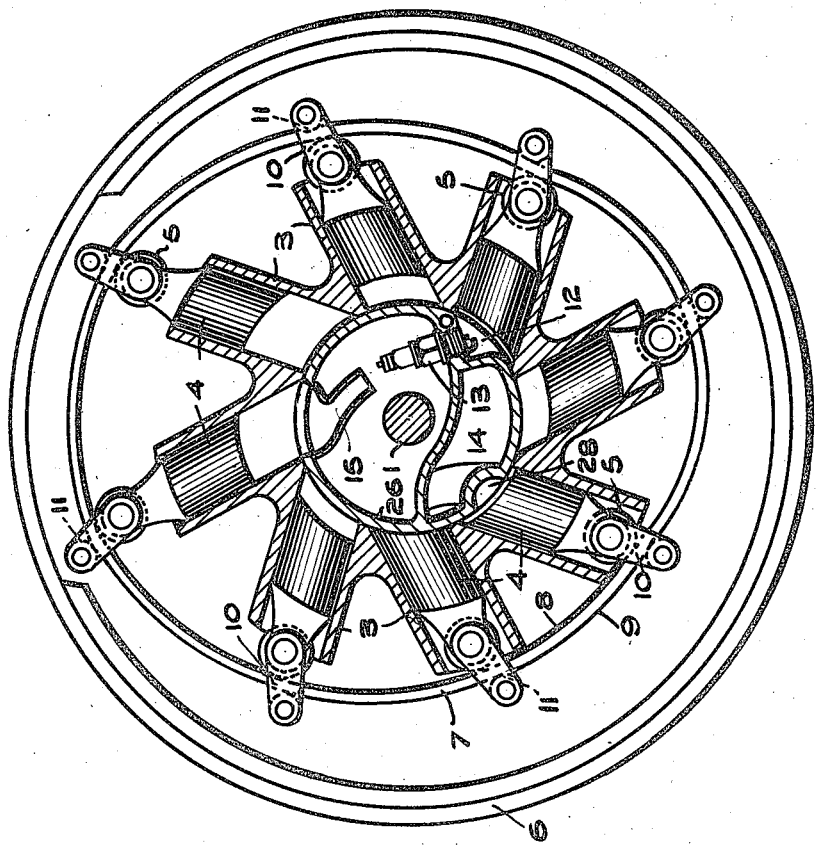
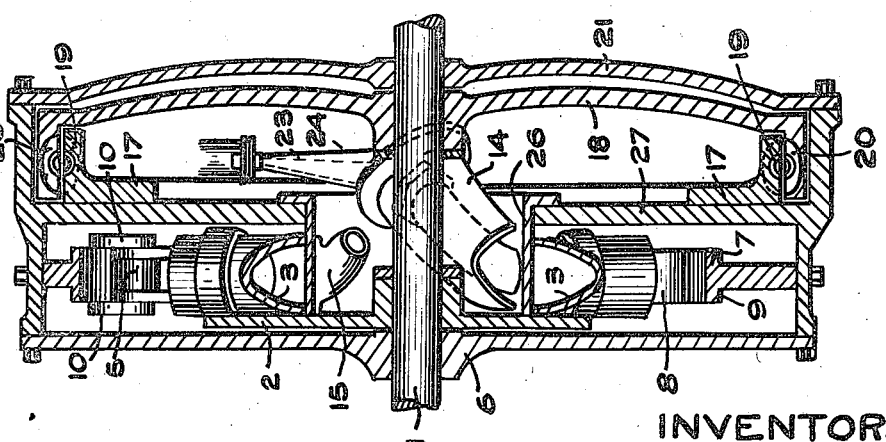
INVENTORS.
D.S. Atkinson
J. McKenzie
By Featherstonhaugh & Co
Att'ys.

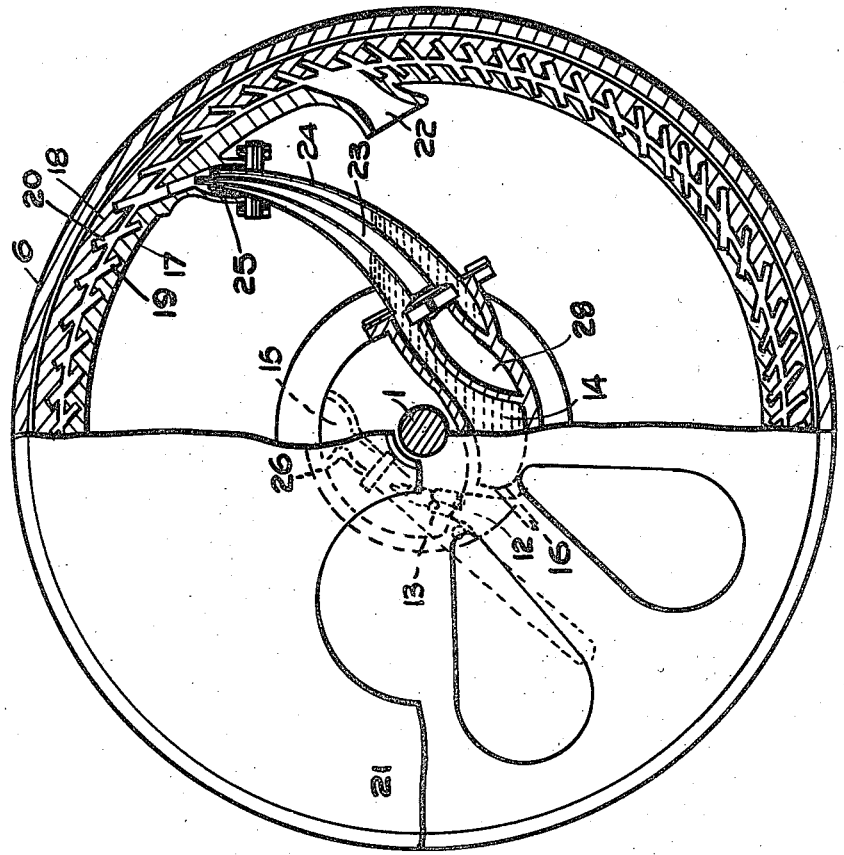
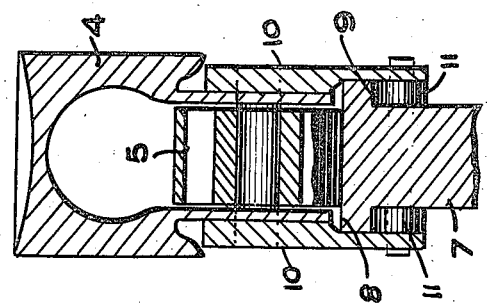
INVENTORS
D.S. Atkinson
J. McKenzie
By Fetherstonhaugh Co
Att'ys.

May 22, 1923. 1,456,479
D. S. ATKINSON ET AL
COMBINED INTERNAL COMBUSTION AND TURBINE ENGINE
Filed April 15, 1920 4 Sheets-Sheet 3
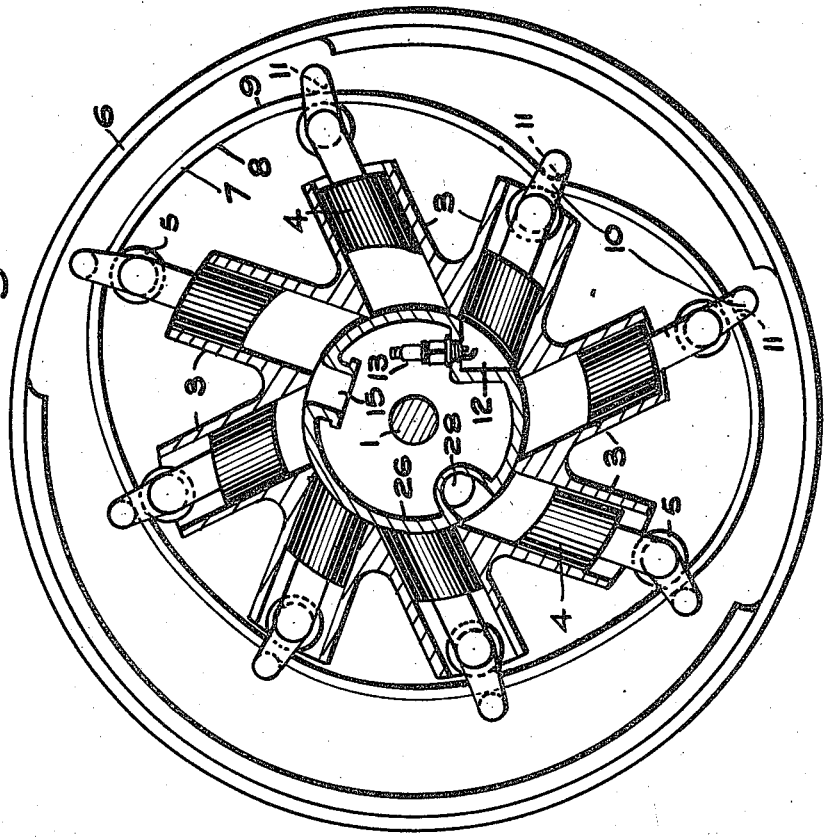
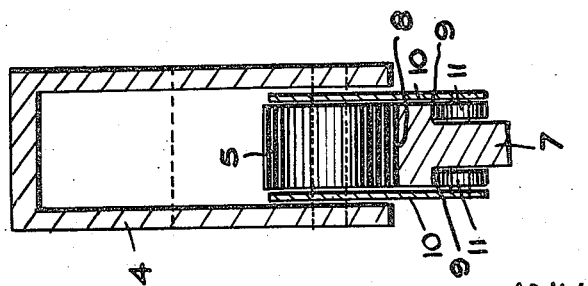
INVENTORS.
D.S. Atkinson
J. McKenzie
By Fetherstonhaugh Co
Attys May 22, 1923.
D. S. ATKINSON ET AL
1,456,479
COMBINED INTERNAL COMBUSTION AND TURBINE ENGINE
Filed April 15, 1920    4 Sheets-Sheet 4
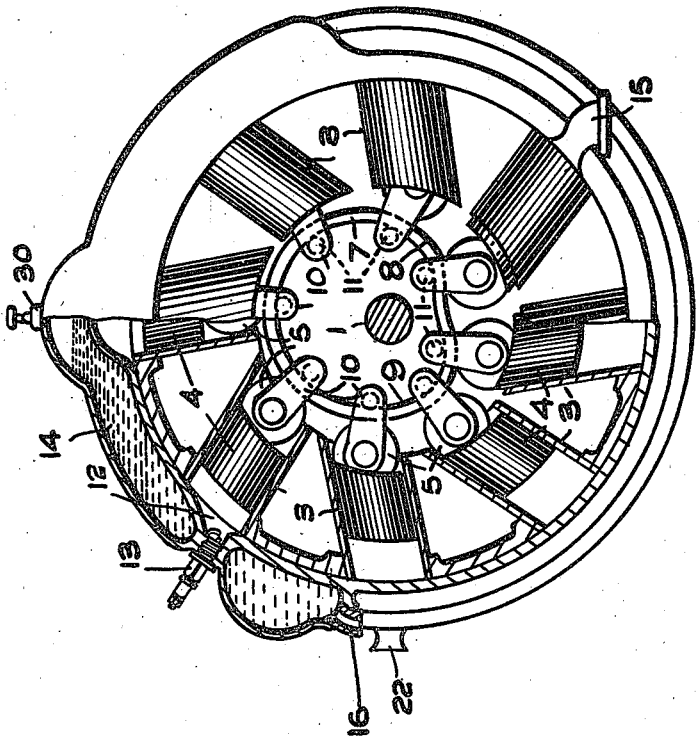
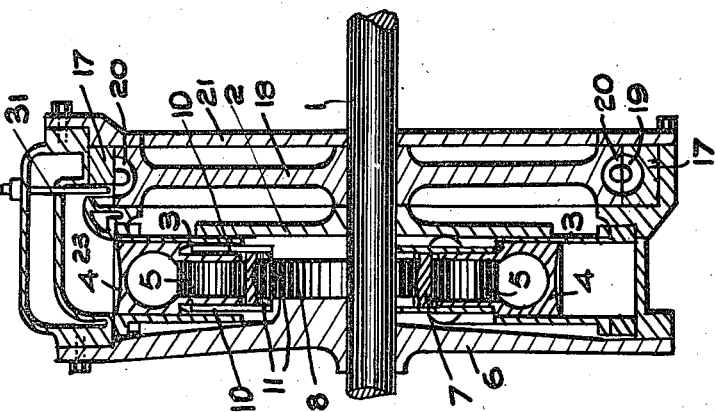
INVENTORS.
D.S.Atkinson
J.McKenzie Patented May 22, 1923.

1,456,479

UNITED STATES PATENT OFFICE.

DALE SYDNEY ATKINSON AND JAMES McKENZIE, OF TORONTO, ONTARIO, CANADA.

COMBINED INTERNAL-COMBUSTION AND TURBINE ENGINE.

Application filed April 15, 1920.  Serial No. 374,140.

*To all whom it may concern:*

Be it known that we, DALE SYDNEY ATKINSON and JAMES McKENZIE, both of the city of Toronto, in the county of York, in the Province of Ontario, Canada, have invented certain new and useful Improvements in Combined Internal-Combustion and Turbine Engines, of which the following is the specification.

Our invention relates to improvements in combined internal combustion and turbine engines and the object of the invention is to devise an engine of the class described which will partially explode the charge in the reciprocating internal combustion part of the engine and in which the partially exploded exhaust gases are introduced into the turbine part of engine in combination with steam generated from the water jacket of the reciprocating part. A further object is to so introduce the steam into the turbine portion of the engine in combination with the exhaust gases that these burning gases will superheat such steam before introduction into the turbine and will generate further power by completing their combustion therein. A still further object is to construct the reciprocating part of the engine so that an impulse is given each piston for each revolution of the shaft. A still further object is to construct an engine in which the design will be simplified by the elimination of valves, cranks and connecting rods.

Our invention consists of a main shaft, a spider secured to the main shaft and adapted to revolve therewith, cylinders suitably offset from centre of the shaft, pistons adapted to reciprocate in said cylinders, a stationary housing, a piston actuating cam suitably secured to such housing, means for connecting the pistons to the cam, a combustion chamber, a water jacket, a stator carried by said housing, a rotor secured to the main shaft, said rotor and stator provided with a plurality of opposed bucket portions, means for introducing gas into the combustion chamber and means for introducing the steam generated in the water jacket into the buckets in the turbine portion and means for expelling the partially combusted gases in combination with the steam into the said buckets. Another object is to construct an engine in which the scavenging of each cylinder is complete, all as hereinafter more particularly described and illustrated in the accompanying drawings in which:—

Fig. 1 represents a vertical section through the reciprocating internal combustion portion of an engine constructed according to our invention.

Fig. 2 is a cross section thereof.

Fig. 3 is an elevation of the turbine portion of the engine, part of same being shown in section.

Fig. 4 is a sectional detail showing a piston and a modified form of connections between the same and the cam.

Fig. 5 is an elevation of a modified form of engine showing same partly in section.

Fig. 6 is a cross section thereof.

Fig. 7 is a sectional detail of a piston and a modified form of connections used in the type of engine depicted in Figures 5 and 6.

Fig. 8 is an elevation (partly in section) of a modified form of reciprocating internal combustion portion in which the cam is so designed that the combusted gases will be fully expanded before being ejected from the reciprocating portion.

Like characters of reference indicate corresponding parts in the different views.

1 is the main shaft, 2 is the spider secured to the shaft 1 and carrying the offset cylinders 3. These cylinders are so offset that their longitudinal axis is a tangent to a circle concentric with the shaft.

4 are pistons adapted to be reciprocated in the cylinders 3, each of said pistons carrying the rollers 5 revolubly mounted therein. 6 is the housing carrying the main shaft 1, and 7 is the piston actuating cam suitably secured to such housing. This cam 7 is provided with two faces 8 and 9. The rollers 5 engage the cam face 8. 10 are links swingably mounted on the said pistons and carrying on their outer ends the rollers 11 which engage the faces 9 of the said cam. The rollers 5 are the power rollers and the rollers 11 are merely subsidiary rollers for drawing the pistons into the suction position.

12 is the combustion chamber provided with a suitable ignition means such as the spark plug 13. 14 is the water jacket, 15 is the gas intake port suitably connected to an intake manifold connected in turn with the usual carburetor, 16 is the water intake to the jacket 14.

17 is the stator suitably secured to the housing 6 and 18 is a rotor suitably secured to the shaft 1, the stator 17 and the rotor 18 being provided with the opposed buckets 19 and 20 respectively.

21 is an end plate suitably secured to the housing 6, 22 is the exhaust orifice through which the exhaust gases and steam are finally ejected from the turbine, in the form of engine shown in Figures 1, 2, and 3. The partially combusted gases are introduced to the turbine through a nozzle 23 inserted within the steam nozzle 24. The upper end of the latter nozzle is provided with a suitable stuffing box 25. It will also be seen on reference to the figures stated that the piston actuating cam in this instance is placed exteriorly whereas in the modification depicted in Figures 5 and 6 it is placed interiorly. The combustion chamber and water jacket are also placed interiorly of the drum 26 which is suitably secured to the diaphragm 27 secured to the housing 6. The pistons have their heads at their inner ends whereas in the modified form, shown in Figures 5 and 6 these heads are at their outer ends.

The operation of the engine illustrated in Figures 1, 2 and 3 is as follows:—

The gas is introduced into the combustion chamber 12 through the intake port 15, the pistons 4 then being at the bottom of the stroke as indicated in the uppermost piston in Figure 1. The engine revolving in a clockwise direction, the piston is forced up in the cylinder 3 by the action of the power roller 5 engaging the inner face 8 of the cam 7. This compresses the gas to the full extent when it is introduced into the combustion chamber 12. The gas is now ignited by the spark plug 3 or other suitable ignition device. The cylinders being offset as indicated, an impulse is thus given to the fired cylinder in a clockwise direction. As the cylinder revolves the gas expands and forces the piston down in the cylinder a certain extent. Then owing to the shape of the cam 7 the piston is forced up again and the gas ejected through the exhaust port 28 into the nozzle 23 and thus into the buckets 19 and 20 of the turbine. On rotation of the turbine the expanding gas is further combusted and expanded and is driven from bucket 19 to bucket 20 alternately until finally ejected from exhaust orifice 22. The water in the jacket 14 is heated by the heat generated in the combustion chamber 12 due to the explosion of the gases therein. This causes steam to be generated in such water jacket and this steam is exhausted through the nozzle 24 into the buckets 19 and 20 of the turbine. A siphoning effect is obtained by reason of the exhaust gases being forced through the same nipple 29 as the steam. The hot exhaust gases in the nozzle 23 serve to superheat the steam in the nozzle 24 and it is further superheated in the buckets 19 and 20. The steam being superheated, it will undergo a certain chemical change and oxygen will be set free to unite with the exhaust gases whereby further regeneration of the same takes place, thus further expanding the gas and utilizing this power in the turbine.

As a cylinder and corresponding piston complete the revolution the piston is thrown outward under the action of centrifugal force and further aided by the rollers 11 engaging the face 9 of the cam 7. This completes the cycle of one cylinder. Each cylinder, of course, operates in exactly the same manner as described above. In the modification shown in Figures 5 and 6 the operation is identical with that described above with the exception that the rollers 11 acting on the face 9 of the cam are essential, as centrifugal force would act against the moving of the pistons into the suction position.

Furthermore the steam in this instance is introduced into the buckets of the turbine through the exhaust gases instead of the gases being introduced through the steam as described above. The result, however, with regard to the superheating of the steam and regeneration of exhaust gases is identical in this form. In this modification a steam control valve 30 is introduced into the exhaust nozzle 23, this valve having a depending nozzle 31 which takes the place of the nozzle 24 in the form shown in Fig. 3.

With regard to the construction of the turbine portion of the engine in this modified form, the stator is situated exteriorly of the rotor instead of the reverse, as shown in Figures 2 and 3. In the modified form shown in Figures 5 and 6 the water jacket and combustion chamber are placed exteriorly instead of in the drum 26 as described above.

In both the forms described above the gas is not fully expanded when ignited as it is not desired to complete combustion prior to the exhaust into the turbine, whereas in the modified form shown in Figure 8, the cam 7 is so designed that the gases will be fully expanded.

From the above description it will be seen that we have devised an engine which will effect considerable saving in fuel for any particular horsepower as the steam being combined with the gas will give increased power. In addition the heat is conserved and utilized in the generation of steam, whereas in the ordinary internal combustion engine the energy of the heat is wasted. Further there is considerable saving in the cost of the ignition system as a complicated distributor or commutator is not required.

It is to be understood that in order to increase the factor of safety we may use a plurality of spark plugs or other suitable ignition device either sparking in sequence or simultaneously, or so designed that in the event of one spark plug failing another spark plug may be thrown into circuit. But even with the employment of a plurality of spark plugs it would not be necessary to use more than three and thus there would be considerable saving in spark plugs and in the complication of an ignition device for an eight cylinder engine.

There is also a great increase in power over an ordinary internal combustion engine of equivalent size and speed owing to the fact that an impulse is given to each piston for each revolution. There is also considerably reduced vibration owing to the continuous power output. In addition there is a considerable saving in weight per horsepower over present types of internal combustion engines at present in use, owing to the increased power output.

What we claim as our invention is—

1. In an internal combustion engine, the combination with a revoluble power shaft, of cylinders mounted about said shaft, pistons reciprocating in said cylinders, a single combustion chamber, ignition means in said combustion chamber, a stationary two-faced cam member, rollers suitably journalled to the pistons and engaging against one face of the cam, yokes pivotally connected to the pistons and rollers journalled to the yokes and engaging the other face of the cam.

2. In an internal combustion engine, a revoluble power shaft, a spider connected thereto, a stationary housing, a hollow drum connected to the housing, a single combustion chamber in the drum, cylinders mounted in the spider, pistons reciprocating in said cylinders, a stationary cam member, rollers suitably journalled to the pistons and engaging against one face of the cam, yokes pivotally connected to the pistons and rollers journalled to the yokes and engaging the other face of the cam.

3. In an internal combustion engine, a revoluble power shaft, cylinders mounted about the power shaft, pistons in the cylinders, a piston actuating cam, said cam having two faces, a hollow drum, a combustion chamber in the periphery of the hollow drum, suitably situated intake and exhaust ports in the periphery of said hollow drum, rollers revolubly mounted on the pistons engaging one face of the said cam, yokes pivotally connected to said pistons and rollers revolubly mounted on the yokes and engaging the other face of said cam.

4. In a combined internal combustion and turbine engine, the combination with a rotatable power shaft, cylinders mounted about said power shaft, a single combustion chamber, intake and exhaust ports communicating with said cylinders upon their rotation, pistons in said cylinders, means for actuating said pistons, a water jacket in proximity to said combustion chamber, a rotor secured to said power shaft, a stator, opposed buckets in the rotor and stator and nozzles respectively connecting the exhaust port and water jacket with the stator for simultaneously admitting the exhaust gases from the cylinders and the steam from the water jacket into the opposed buckets, said nozzle connecting with the exhaust port extending through the nozzle connecting with the water jacket.

DALE SYDNEY ATKINSON.
JAMES McKENZIE.